US011359032B2

(12) United States Patent
Wang et al.

(10) Patent No.: US 11,359,032 B2
(45) Date of Patent: Jun. 14, 2022

(54) SELF-REGULATING EXTERNAL ELECTRON DONOR-CONTAINING CATALYST USED FOR ALPHA-OLEFIN POLYMERIZATION, AND APPLICATION OF CATALYST

(71) Applicants: Yingkou Xiangyang Catalyst Co., Ltd., Liaoning (CN); Dalian University of Technology, Liaoning (CN)

(72) Inventors: Licai Wang, Liaoning (CN); Zhanxian Gao, Liaoning (CN); Qinghai Sun, Liaoning (CN); Limei Yu, Liaoning (CN); Huan Wang, Liaoning (CN); Wei Li, Liaoning (CN); Guotong Zheng, Liaoning (CN); Qingxin Dong, Liaoning (CN); Yongqiang Wang, Liaoning (CN); Wenwei Wang, Liaoning (CN); Zhe Yuan, Liaoning (CN); Yang Li, Liaoning (CN)

(73) Assignee: Yingkou Xiangyang Catalyst Co., Ltd

( * ) Notice: Subject to any disclaimer, the term of this patent is extended or adjusted under 35 U.S.C. 154(b) by 98 days.

(21) Appl. No.: 16/335,910

(22) PCT Filed: Oct. 25, 2017

(86) PCT No.: PCT/CN2017/107598
§ 371 (c)(1),
(2) Date: Mar. 22, 2019

(87) PCT Pub. No.: WO2018/050126
PCT Pub. Date: Mar. 22, 2018

(65) Prior Publication Data
US 2019/0211116 A1 Jul. 11, 2019

(30) Foreign Application Priority Data
Sep. 30, 2017 (CN) .......................... 201710939061.8

(51) Int. Cl.
| | | |
|---|---|---|
| C08F 4/642 | (2006.01) | |
| C08F 10/06 | (2006.01) | |
| C08F 4/647 | (2006.01) | |
| C08F 110/06 | (2006.01) | |
| C08F 2/38 | (2006.01) | |
| C08F 4/649 | (2006.01) | |
| C08F 4/659 | (2006.01) | |
| C08F 210/02 | (2006.01) | |
| C08F 210/06 | (2006.01) | |
| C08F 2/34 | (2006.01) | |
| C08F 210/08 | (2006.01) | |

(52) U.S. Cl.
CPC ............. *C08F 4/6421* (2013.01); *C08F 2/34* (2013.01); *C08F 2/38* (2013.01); *C08F 4/647* (2013.01); *C08F 4/6494* (2013.01); *C08F 4/65916* (2013.01); *C08F 10/06* (2013.01); *C08F 110/06* (2013.01); *C08F 210/02* (2013.01); *C08F 210/06* (2013.01); *C08F 210/08* (2013.01)

(58) Field of Classification Search
CPC ........ C08F 4/6421; C08F 10/06; C08F 4/647; C08F 110/06; C08F 2/38; C08F 4/6494; C08F 4/65916
See application file for complete search history.

(56) References Cited

U.S. PATENT DOCUMENTS

| | | | | |
|---|---|---|---|---|
| 6,395,670 | B1 * | 5/2002 | Morini ..................... | C08F 10/00 502/104 |
| 7,163,905 | B2 * | 1/2007 | Thorman ................ | C08F 10/00 502/116 |
| 2014/0046009 | A1 * | 2/2014 | Chen ...................... | C08F 110/06 526/124.2 |
| 2016/0009833 | A1 | 1/2016 | Sukhdeep et al. | |
| 2016/0347882 | A1 | 12/2016 | Singh et al. | |

FOREIGN PATENT DOCUMENTS

| | | | |
|---|---|---|---|
| CN | 1856514 A | 11/2006 | |
| CN | 102391397 A | 3/2012 | |
| CN | 103554312 A | 2/2014 | |
| WO | WO-2015065990 A1 * | 5/2015 | ............ C08F 210/06 |
| WO | 2018050126 A2 | 3/2018 | |

OTHER PUBLICATIONS

Wang, Licai; International Search Report and Written Opinion for serial No. PCT/CN2017/107598, filed Oct. 25, 2017, dated Jun. 27, 2018, 16 pgs (8 pgs of English Translation and 8 pgs of Official copy).

* cited by examiner

*Primary Examiner* — Catherine S Branch
(74) *Attorney, Agent, or Firm* — Taylor English Duma LLP

(57) ABSTRACT

Disclosed are a Z-N catalyst for α-olefin polymerization and an application thereof, specifically, an industrial production catalyst consisting of (A) a solid catalyst component, (B) a cocatalyst organoaluminum compound and (C) an external electron donor compound and used for α-olefin polymerization or copolymerization processes. The catalyst component is prepared from a transition metal such as titanium and magnesium and a composite aromatic diacid diester/1,3-diether as an internal electron donor. One or more organoaluminum compounds or a mixture thereof serve as the cocatalyst. One or more structure control agent hydrocarbyl alkoxysilicons are compounded with one or more activity regulator organic acid esters as the external electron donor capable of automatically adjusting the polymerization rate. The Z-N catalyst is used for α-olefin polymerization/copolymerization, and can automatically adjust the polymerization rate at a higher polymerization temperature so as to maintain stable operation of a reactor.

20 Claims, No Drawings

SELF-REGULATING EXTERNAL ELECTRON DONOR-CONTAINING CATALYST USED FOR ALPHA-OLEFIN POLYMERIZATION, AND APPLICATION OF CATALYST

FIELD OF THE INVENTION

The present invention relates to the field of preparation and application of catalysts for α-olefin polymerization, specifically, an external electron donor capable of automatically adjusting the activity in a Ziegler-Natta-type (Z-N) catalyst for α-olefin polymerization or copolymerization, and an application thereof.

BACKGROUND OF THE INVENTION

A Z-N catalyst system has been continuously developed from its advent and has become a main body of catalyst systems for industrialized olefin polymerization. Its development stages mainly include advancement in the preparation process of supports, development in internal electron donors, and improvement in external electron donors. The internal electron donors promoting the development of Z-N catalysts have been developed from monobasic acid esters such as ethyl benzoate and ethyl p-ethoxybenzoate to dibasic acid esters such as dibutyl phthalate with good overall performance. Then, Montell Technology Company B. V. proposes the preparation of catalyst components with 1,3-diether as an internal electron donor (CN: ZL998006 5.5), which promotes the development of catalyst systems, and also makes the research on internal electron donors of catalyst components become a hotspot. 1,3-diether such as 9,9-bis(methoxymethyl) fluorene, as an internal electron donor to synthesize a catalyst component for olefin polymerization, has the advantages of low polymerization temperature, high catalyst activity, and high tacticity of poly-α-olefins (the percentage of xylene insolubles, the percentage of n-hexane insolubles in the present invention) even when other external electron donors are not required. 9,9-bis(methoxymethyl) fluorene may also be used as an external electron donor. However, when a catalyst with 1,3-diether as an internal electron donor catalyzes olefin polymerization, the resulting polyolefins have a narrow molecular weight distribution, thus limiting application of the polyolefins. When di-n-(iso)butyl phthalate with good versatility is compounded with 1,3-diether as an internal electron donor, a catalyst for olefin polymerization with balanced performance is obtained. The external electron donors controlling the tacticity of poly-α-olefins have also been developed from ester compounds to the fourth generation hydrocarbyl alkoxysilicons.

The α-olefin polymerization or copolymerization is strongly exothermic reaction. The polymerization temperature control is very important, and when a normal polymerization temperature of 65-70° C. is exceeded, explosive polymerization, softening, adhesion and agglomeration, and adhesion to the reactor wall of polymer particles, exfoliation of flaky polymers, pipe clogging, and even forced shutdown accidents will be caused.

SUMMARY OF THE INVENTION

The objective of the present invention is to develop a new composite external electron donor, which can, at an abnormal polymerization temperature (85-110° C.), automatically adjust the catalyst activity, change the polymerization rate, and make the temperature quickly fall back to a normal polymerization temperature (65-70° C.), so as to achieve stable control of the reaction temperature and prevent occurrence of "explosive polymerization" accidents. In addition, even at a temporary abnormal polymerization temperature, the tacticity of poly-α-olefins is kept unchanged.

The main content of the present invention is improvement on the performance of a Z-N catalyst for α-olefin polymerization and development of an external electron donor capable of automatically adjusting the polymerization activity, so as to form a catalyst for stable control of the reaction temperature in large-scale industrial preparation of poly-α-olefins. The Z-N catalyst is composed of three components (A), (B) and (C), namely: a catalyst component A, a cocatalyst alkyl aluminum B, and an external electron donor C capable of automatically adjusting the catalyst activity, wherein:

(1) the catalyst component A is composed of at least a transition element such as titanium (ions) and a composite internal electron donor aromatic diacid dialkyl ester and 1,3-diether supported on magnesium chloride; and the preparation method of the catalyst component A comprises: a). co-precipitation of a magnesium chloride alcoholate, a composite internal electron donor and titanium tetrachloride; b). supporting titanium tetrachloride and a composite internal electron donor on a spherical magnesium chloride alcoholate support; and c). supporting a composite internal electron donor on magnesium chloride generated by reaction of diethoxymagnesium and titanium tetrachloride; the methods a) to c) listed in the present invention all are known technologies and common methods for preparing the catalyst component A by those skilled in the art. For example, the applicant uses the method a) to develop some new technologies of preparation and use of the catalyst component A (CN100,491,415C, U.S. Pat. No. 8,344,080 B$_2$, U.S. Pat. No. 7,964,678B$_2$).

(2) the cocatalyst alkyl aluminum B is triethyl aluminum, triisobutyl aluminum or a mixture thereof, more usually triethyl aluminum.

(3) the external electron donor C capable of automatically adjusting the catalyst activity comprises a structure control agent and an activity regulator, used in combination or alone as the external electron donor C capable of automatically adjusting the catalyst activity. The kinds and amounts of the structure control agent and the activity regulator are selected according to the amounts of two internal electron donors in the catalyst component A, such that the polymerization activity at an abnormal polymerization temperature of 85-110° C. of the catalyst is less than the polymerization activity at a normal polymerization temperature of 65-70° C., so as to satisfy the requirements in tacticity of grades of poly-α-olefins.

For the Z-N catalyst of the above technical solution, in the catalyst component A, the aromatic diacid dialkyl ester is di-n-(iso)butyl phthalate; the 1,3-diether is 2,2-dialkyl-1,3-dimethoxypropane and commonly 9,9-bis(methoxymethyl) fluorene, which has been developed as an industrial product by the applicant. A typical composite internal electron donor consists of di-n-(iso)butyl phthalate and 9,9-bis(methoxymethyl) fluorene.

For the Z-N catalyst of the above technical solution, the structure control agent is selected from hydrocarbyl alkoxysilicon external electron donors commonly used for the fourth generation Z-N catalysts so as to control the structure of poly-α-olefins. The commonly used one is hydrocarbyl methoxysilicon $R_nSi(OCH_3)_{(4-n)}$ where, generally, n=1 or 2. When n=1, R is a $C_{1-10}$ linear or branched alkyl, $C_{5-10}$ cycloalkyl, alkylcycloalkyl or cycloalkylalkyl, $C_{6-10}$ phenyl, phenylalkyl or alkylphenyl. When n=2, R is two hydrocarbyl groups $R^1$ and $R^2$, which may be the same or different and are $C_{1-6}$ linear or branched alkyl, $C_{5-6}$ cycloalkyl, $C_{1-6}$ alkyl and cycloalkyl, or phenyl.

One important $R_nSi(OCH_3)_{(4-n)}$ is hydrocarbyl methoxysilicons commonly used for industrial polymerization catalysts of propylene. These include $C_{1-10}$ linear or branched alkyltrimethoxysilicon, phenyltrimethoxysilicon, $C_{3-10}$ linear or branched dialkyldimethoxysilicon, $C_{1-10}$ linear or branched alkyl $C_{5-6}$ cycloalkyldimethoxysilicon, $C_{5-6}$ dicycloalkyldimethoxysilicon, and diphenyldimethoxysilicon.

Further, the hydrocarbyl alkoxysilicon is selected from hydrocarbyl alkoxysilicons commonly used for industrial polymerization of propylene, such as: propyltrimethoxysilicon, phenyltrimethoxysilicon, diisopropyldimethoxysilicon, diisobutyldimethoxysilicon, methylcyclohexyldimethoxysilicon, dicyclopentyldimethoxysilicon, and diphenyldimethoxysilicon.

As the structure control agent, 1,3-diether, particularly 9,9-bis(methoxymethyl) fluorene is also preferred.

For the Z-N catalyst of the above technical solution, the activity regulator is fatty acid ester or fatty diacid diester, including $C_{10-20}$ linear fatty acid $C_3$-$C_6$ branched alkyl esters or $C_{4-16}$ linear fatty diacid $C_{2-6}$ linear or branched dialkyl esters. Among these, linear fatty acid branched alkyl esters or linear fatty diacid dialkyl esters are important. Esters of natural fatty acids and natural fatty diacids are preferred fatty acid esters.

Further, the activity regulator is selected from at least one of $C_{10-20}$ linear fatty acid $C_{3-5}$ alkyl esters or $C_{6-12}$ linear fatty diacid $C_{3-6}$ dialkyl esters to form the external electron donor C capable of automatically adjusting the catalyst activity, wherein important fatty acid esters are isopropyl laurate, isoamyl laurate, isopropyl myristate, isopropyl palmitate, isopropyl stearate, diethyl adipate, di-n-butyl adipate, diisobutyl adipate, diethyl suberate, di-n-butyl suberate, diisobutyl suberate, diethyl sebacate, di-n-butyl sebacate, and diisobutyl sebacate.

As the activity regulator, glycerides of natural fatty acids are also preferred.

Long-chain natural fatty acid esters are "green" chemicals and a cosmetic base, and when remaining in polypropylene, do not affect the application performance of the polymer and can also act as a plasticizer. Linear fatty diacid diesters are also "green" chemicals and are a plasticizer for polypropylene themselves. Natural fatty acid glycerides are also "green" chemicals, and when remaining in polypropylene, do not affect the application performance of the polymer and can also act as a plasticizer. Raw materials of long-chain natural fatty acid esters and linear fatty diacid diesters come from natural resources, can be conveniently obtained, are "green", and have simple production process, low price, and adequate market supply.

The activity regulator fatty acid ester and fatty diacid diester is compounded with the structure control agent as an external electron donor. As the polymerization temperature increases, the polymerization activity decreases, and the polymerization activity at an abnormal polymerization temperature of 85-110° C. is less than the activity at a normal polymerization temperature of 65-70° C. by 30-40%, and even 50%. Therefore, the selection of a fatty acid ester and a fatty diacid diester as an activity regulator in the present invention brings out a significant effect of automatically adjusting the polymerization rate. At an abnormal polymerization temperature, the activity regulator functions to automatically adjusting the polymerization rate, namely, adjusting the polymerization temperature to quickly fall back to a normal polymerization temperature. At a normal polymerization temperature, the polymerization activity may be higher than the activity of the catalyst only with the structure control agent. This is a first main advantage of the present invention.

When two internal electron donors in the catalyst component A are present in particular amounts and special performance of the catalyst is required, the external electron donor C capable of automatically adjusting the catalyst activity may comprise only the activity regulator fatty acid ester or fatty diacid diester. For example, generally, a polypropylene film material with a tacticity of 95% is a qualified material. In this case, for some catalyst components A with a high amount of 9,9-bis(methoxymethyl) fluorene, only by using a fatty acid ester as an external electron donor, polypropylene with a tacticity of 95% can be obtained and also the polymerization temperature can be automatically adjusted. This is a second main advantage of the present invention.

The flexible selection of the kinds and amounts of the structure control agent and the activity regulator according to the relative amounts of two internal electron donors so as to form the external electron donor capable of automatically adjusting the catalyst activity is a third main advantage of the present invention. The main function of the structure control agent is that it is combined with the activity regulator to form the external electron donor capable of automatically adjusting the catalyst activity, such that the structure of the polymer is controlled to remain substantially unchanged. With some combination of the structure control agent and the activity regulator, the polymerization activity at an abnormal polymerization temperature of the catalyst being less than the polymerization activity at a normal polymerization temperature can be satisfied, and the polymerization activity is greater than or less than the polymerization activity only using the structure control agent in the same total moles at a normal polymerization temperature, and in either case, stable control of the polymerization temperature can be achieved. This is a fourth main advantage of the present invention. Some combination of the structure control agent and the activity regulator in the present application satisfies the demands of large-scale industrial production. For example, the combination of propyltrimethoxysilicon and isopropyl myristate has been used for a long-term period on large-scale industrial production devices for many continuous gas-phase polymerization processes, so as to prevent occurrence of "explosive polymerization" accidents.

The structure control agent phenyltrimethoxysilicon is combined with the activity regulator isopropyl palmitate as the external electron donor C capable of automatically adjusting the activity, and the amount of the activity regulator does not affect basic properties of the catalyst and polypropylene. At a polymerization temperature of 90° C., a relative amount of isopropyl palmitate increases from 10% to 90%, the catalyst activity is 2.8-3.2 kg PP/g catalyst, and the polymer has an apparent density of 0.42-0.43, a melt index of 4.25-5.21 g/min, and a tacticity of 97.5-97.7%. This represents a fifth main advantage of the present invention.

The use of the structure control agent and the activity regulator according to the present application is flexible and convenient. The structure control agent and the activity regulator may be added into the polymerization system simultaneously or separately; the activity regulator may also be added into the polymerization system simultaneously with the catalyst component A or the cocatalyst component B, and in the continuous operation process with multiple reactors in series, may also be added into a different reactor.

Generally, the industrial polymerization temperature of propylene is 65-70° C. It is defined in the present application that the abnormal polymerization temperature is 85-110° C., preferably 100° C. Experiments have demonstrated that at 110° C., the polymerization activity of propylene is very small, and sometimes even 0. Therefore, it is determined in the present invention that the abnormal polymerization temperature of the external electron donor C capable of automatically adjusting the activity is 100° C.

For the Z-N catalyst of the above technical solution, specifically, in the catalyst component A, the mass fraction of titanium is 2.0-3.8%, the mass fraction of magnesium is 15.0-20.0%, the mass fraction of 1,3-diether is 1-13%, and the mass fraction of the aromatic diacid dialkyl ester is 1-8%.

For the Z-N catalyst of the above technical solution, specifically, a molar ratio of total moles of the external electron donor C capable of automatically adjusting the activity and metal titanium ions (Ti) in the catalyst component A is 1-500:1, preferably 1-100:1.

For the Z-N catalyst of the above technical solution, specifically, a molar ratio of di-n-(iso)butyl phthalate and 9,9-bis(methoxymethyl) fluorene is 1-9.9:10.

For the Z-N catalyst of the above technical solution, specifically, a molar ratio of the structure control agent and the activity regulator is 0-10:10.

For the Z-N catalyst of any of the above technical solutions, the Z-N catalyst is applied in polymerization and copolymerization of α-olefins, and the application comprises: propylene polymerization, 1-butene polymerization, ethylene and propylene copolymerization, ethylene and 1-butene copolymerization, and propylene and 1-butene copolymerization, importantly propylene polymerization and ethylene and propylene copolymerization.

For an application of the Z-N catalyst as described above, the improved Z-N catalyst of the present invention is used for propylene polymerization, and the resulting polypropylene has a tacticity of 95-99%, depending on the molar ratio of di-n-(iso)butyl phthalate and 9,9-bis(methoxymethyl) fluorene in the composite internal electron donor in the solid catalyst component A and the combination of the external electron donor C capable of automatically adjusting the activity. When the ratio of the internal electron donors and the combination of the external electron donor C are determined, the tacticity of polypropylene is also determined, and even if the polymerization temperature increases to 110° C., the tacticity of polypropylene remains substantially unchanged, and even remains at the tacticity of polypropylene produced at a normal polymerization temperature. Even if explosive polymerization occurs, the tacticity of the generated polypropylene remains substantially unchanged, ensuring the quality of polypropylene. This is a sixth main advantage of the catalyst system of the present invention.

The kinds and the molar ratio of the structure control agent hydrocarbyl alkoxysilicon and the activity regulator fatty acid ester are adjusted according to the molar ratio of the 1,3-diether and the aromatic diacid dialkyl ester in the catalyst component A, so as to maintain stable operation with a high activity of the catalyst and a suitable tacticity of polypropylene.

The polymerization and the copolymerization of α-olefins are continuous polymerization, particularly continuous gas-phase polymerization; the continuous polymerization is performed in more than one reactor in series, or the continuous polymerization is performed in a fluidized bed reactor.

The external electron donor capable of automatically adjusting the activity according to the present application is suitable for various polymerization and copolymerization processes of α-olefins, particularly for continuous polymerization, especially continuous gas-phase polymerization. The continuous polymerization and copolymerization of α-olefins are performed in more than one reactor in series, or in a fluidized bed reactor.

Advantageous Effect (1) The kinds and the molar ratio of the structure control agent hydrocarbyl alkoxysilicon and the activity regulator fatty acid ester are adjusted according to the molar ratio of the 1,3-diether and the aromatic diacid dialkyl ester in the catalyst component A, so as to maintain stable operation with a high activity of the catalyst and a suitable tacticity of polypropylene, thus expanding grades of poly-α-olefins generated.

(2) The catalytic activity with the activity regulator being added may be higher than the activity of the catalyst using the structure control agent alone, thus expanding the selection range of the structure control agent of the catalyst.

(3) At different temperatures, the tacticity of polypropylene obtained by propylene polymerization using the present catalyst system remains unchanged. The quality of polypropylene during the overall polymerization process (including that at an abnormal polymerization temperature) is ensured.

(4) The catalyst system with the external electron donor capable of automatically adjusting the activity according to the present application achieves a good effect in long-term application for industrial mobile stirred-tank polymerization process and large-scale gas-phase fluid-bed polymerization process, and prevents occurrence of "explosive polymerization".

DETAILED DESCRIPTION OF THE INVENTION

The following non-limiting examples are used to illustrate the combination and properties of the structure control agent and the activity regulator suitable for the present catalyst system, to enable those skilled in the art to understand the present invention more fully. However, these examples are not meant to limit the claimed invention in any way.

Various structure control agents and activity regulators supplied in the market are designed to form several structure control agent/activity regulator combination groups. Each combination group is formulated into a 10% hexane solution, and unless otherwise indicated, the mass ratio of the structure control agent and the activity regulator is 20:80; the structure control agent or the activity regulator alone is also formulated into a 10% hexane solution; reproducibility of each experiment is ensured. The experiments are performed in a 5 L autoclave by bulk polymerization. Each experiment follows the following procedure, and the experiments using only the structure control agent or the structure control agent/activity regulator combination are carried out respectively. For each experiment, an amount of polypropylene generated before reaching the polymerization temperature is made first: when the temperature of the polymerization reactor is raised at a uniform speed to reach the polymerization temperature, propylene in the reactor is immediately vented, and dry polypropylene is weighted. Then, the polymerization experiment is performed, and when the temperature of the polymerization reactor is raised at a uniform speed to reach the polymerization temperature, recording time is started. After 1 h reaction, propylene in the reactor is immediately vented, and dry polypropylene is weighted. When the catalyst activity is calculated, the amount of polypropylene generated before reaching the polymerization temperature is subtracted. The pressure of the reactor before stopping the polymerization for each time is the saturated vapor pressure of propylene at the polymerization temperature, otherwise, the experiment needs to be done again. Each experiment is repeated three times and the average is taken. The polymer samples are preserved and determined for other performance data.

The catalyst activity of the present application is an average after a number of corrections, and is referred to as standard catalytic activity.

Examples 1-8

The catalyst component A was prepared by co-precipitation.

Using 0.02 g the catalyst component A containing 17.17% of magnesium, 2.24% of titanium, 1.68% of di-isobutyl phthalate, and 5.0% of 9,9-bis(methoxymethyl) fluorene, 1.5 ml the cocatalyst triethyl aluminum, and the external electron donor C comprising the structure control agent hydrocarbyl alkoxysilicon and the activity regulator fatty acid ester, the experiment results are shown in Table 1.

TABLE 1

| Experiment | Structure control agent | Activity regulator | External electron donor/titanium/ (molar ratio) | Temperature/° C. | Standard catalyst activity At° C./ kgpp/gcat | Tacticity/% | Melt index/ g/10 min | $A_{t°C.}/A_{70°C.}/\%$ |
|---|---|---|---|---|---|---|---|---|
| $A_0$ | Diisobutyl-dimethoxysilicon | None | 20 | 70 | 40.0 | 97.2 | 9.75 | |
| $A_1$ | Diisobutyl-dimethoxysilicon | Isopropyl palmitate | 20 | 70 | 37.0 | 95.4 | 50.95 | 100 |
| $A_2$ | Diisobutyl-dimethoxysilicon | Isopropyl palmitate | 20 | 100 | 24.7 | 95.5 | | 66.8 |
| $A_3$ | Diisobutyl-dimethoxysilicon | Isopropyl palmitate | 20 | 110 | 11.0 | 95.8 | | 29.7 |
| $A_4$ | Diisobutyl-dimethoxysilicon | Isopropyl palmitate | 20 | 120 | 5.0 | | | 13.5 |
| $B_0$ | Methylcyclohexyl-dimethoxysilicon | None | 20 | 70 | 26.0 | 95.5 | 11.46 | |
| $B_1$ | Methylcyclohexyl-dimethoxysilicon | Isopropyl stearate | 20 | 70 | 34.0 | 95.7 | 39.56 | 100 |
| $B_2$ | Methylcyclohexyl-dimethoxysilicon | Isopropyl stearate | 20 | 100 | 30.0 | 95.3 | 111.1 | 88.2 |
| $B_3$ | Methylcyclohexyl-dimethoxysilicon | Isopropyl stearate | 20 | 110 | 10.3 | 95.0 | | 30.3 |
| $C_0$ | Phenyltrimethoxy-silicon | None | 30 | 70 | 22.0 | 98.1 | 5.6 | |
| $C_1$ | Phenyltrimethoxy-silicon | Isopropyl myristate | 30 | 70 | 35.0 | 98.1 | | 100 |
| $C_2$ | Phenyltrimethoxy-silicon | Isopropyl myristate | 30 | 100 | 25.0 | 98.2 | 28.1 | 71.4 |
| $C_3$ | Phenyltrimethoxy-silicon | Isopropyl myristate | 30 | 110 | 16.0 | | | 45.7 |
| $F_0$ | Propyltrimethoxy-silicon | None | 20 | 70 | 25.0 | 97.1 | 9.39 | |
| $F_1$ | Propyltrimethoxy-silicon | Isopropyl myristate | 20 | 70 | 37.0 | 97.2 | | 100 |
| $F_2$ | Propyltrimethoxy-silicon | Isopropyl myristate | 20 | 100 | 21.0 | 96.8 | 41.3 | 56.8 |
| $F_3$ | Propyltrimethoxy-silicon | Isopropyl myristate | 20 | 110 | 18.0 | 97.2 | | 48.6 |
| $G_0$ | Dicyclopentyl-dimethoxysilicon | None | 20 | 70 | 36.1 | 97.4 | 17.14 | |
| $G_1$ | Dicyclopentyl-dimethoxysilicon | Isopropyl myristate | 20 | 70 | 41.7 | 97.3 | 12.76 | 100 |
| $G_2$ | Dicyclopentyl-dimethoxysilicon | Isopropyl myristate | 20 | 100 | 29.0 | 97.5 | 28.9 | 69.5 |
| $G_3$ | Dicyclopentyl-dimethoxysilicon | Isopropyl myristate | 20 | 110 | 9.3 | 96.4 | | 22.3 |
| $H_0$ | Dicyclopentyl-dimethoxysilicon | None | 30 | 70 | 36.0 | 96.6 | 17.14 | |
| $H_1$ | Dicyclopentyl-dimethoxysilicon | Diethyl suberate | 30 | 70 | 41.3 | 97.1 | 10.62 | 100 |
| $H_2$ | Dicyclopentyl-dimethoxysilicon | Diethyl suberate | 30 | 100 | 28.8 | 97.9 | 25.0 | 69.7 |
| $H_3$ | Dicyclopentyl-dimethoxysilicon | Diethyl suberate | 30 | 110 | 7.4 | 96.6 | | 17.7 |
| $I_1$ | Dicyclopentyl-dimethoxysilicon | Dibutyl sebacate | 30 | 70 | 39.4 | 97.4 | 16.75 | 100 |
| $I_2$ | Dicyclopentyl-dimethoxysilicon | Dibutyl sebacate | 30 | 100 | 28.0 | 97.9 | 21.22 | 71.0 |
| $I_3$ | Dicyclopentyl-dimethoxysilicon | Dibutyl sebacate | 30 | 110 | 9.6. | 97.0 | | 24.4 |
| $J_0$ | Diisopropyl-dimethoxysilicon | None | 20 | 70 | 32.0 | 97.5 | 15.29 | |

TABLE 1-continued

| Experiment | Structure control agent | Activity regulator | External electron donor/titanium/ (molar ratio) | Temperature/° C. | Standard catalyst activity At° C./ kgpp/gcat | Tacticity/% | Melt index/ g/10 min | $A_{t° C}/A_{70° C}/\%$ |
|---|---|---|---|---|---|---|---|---|
| $J_1$ | Diisopropyl-dimethoxysilicon | Isopropyl myristate | 20 | 70 | 36.0 | 96.5 | 29.37 | 100 |
| $J_2$ | Diisopropyl-dimethoxysilicon | Isopropyl myristate | 20 | 100 | 28.0 | 96.3 | 76.71 | 77.8 |

Note:
mass ratio of phenyltrimethoxysilicon and isopropyl myristate: 2:98; mass ratio of dicyclopentyldimethoxysilicon and diethyl suberate: 20:40; mass ratio of dicyclopentyldimethoxysilicon and dibutyl sebacate: 20:40.

Examples 9-10

The catalyst component A was prepared by co-precipitation.

Using 0.02 g the catalyst component A containing 17.17% of magnesium, 2.24% of titanium, 1.68% of di-isobutyl phthalate, and 5.0% of 9,9-bis(methoxymethyl) fluorene, 1.5 ml the cocatalyst triethyl aluminum, and the external electron donor C which is the activity regulator fatty acid ester, the polymerization results are shown in Table 2.

TABLE 2

| Experiment | Structure control agent | Activity regulator | External electron donor/titanium/ (molar ratio) | Temperature/° C. | Standard catalyst activity At° C./ kgpp/gcat | Tacticity/% | Melt index/ g/10 min | $A_{t° C}/A_{70° C}/\%$ |
|---|---|---|---|---|---|---|---|---|
| $D_1$ | None | Isopropyl laurate | 20 | 70 | 36.7 | 96.1 | | 100 |
| $D_2$ | None | Isopropyl laurate | 20 | 100 | 25.0 | 96.1 | 40.59 | 68.1 |
| $E_1$ | None | Isopropyl myristate | 30 | 70 | 35.7 | 96.2 | | 100 |
| $E_3$ | None | Isopropyl myristate | 30 | 100 | 31.0 | 96.5 | 44.37 | 75.6 |

Examples 11-12

The catalyst component A was prepared by supporting titanium and a composite internal electron donor on a spherical magnesium chloride alcoholate.

Using 0.02 g the catalyst component A containing 18.23% of magnesium, 3.11% of titanium, 3.07% of di-isobutyl phthalate, and 5.14% of 9,9-bis(methoxymethyl) fluorene, 1.5 ml the cocatalyst triethyl aluminum, and the external electron donor C comprising the structure control agent alkylalkoxysilicon and the activity regulator fatty acid ester, the polymerization results are shown in Table 3.

TABLE 3

| Experiment | Structure control agent | Activity regulator | External electron donor/titanium/ (molar ratio) | Temperature/° C. | Standard catalyst activity At° C./ kgpp/gcat | Tacticity/% | Melt index/ g/10 min | $A_{t° C}/A_{70° C}/\%$ |
|---|---|---|---|---|---|---|---|---|
| $A_0$ | Propyltrimethoxy-silicon | None | | 70 | 41.0 | 95.8 | 12.13 | |
| $A_1$ | Propyltrimethoxy-silicon | Isopropyl myristate | 20 | 70 | 40.0. | 95.5 | 12.8 | 100 |
| $A_2$ | Propyltrimethoxy-silicon | Isopropyl myristate | 20 | 100 | 32.0. | 95.5 | 33.55 | 80.0 |
| $A_3$ | Propyltrimethoxy-silicon | Isopropyl myristate | 20 | 110 | 25.0. | | | 62.5 |
| $B_0$ | Methylcyclohexyl-dimethoxy silicon | None | 20 | 70 | 43.0. | 95.0 | 10.88 | |
| $B_1$ | Methylcyclohexyl-dimethoxysilicon | Isopropyl myristate | 20 | 70 | 39 | 95.4 | 15.32 | 100 |
| $B_2$ | Methylcyclohexyl-dimethoxysilicon | Isopropyl myristate | 20 | 100 | 29 | 95.0 | 21.40 | 74.4 |

Examples 13-20

The catalyst component A was prepared by supporting an internal electron donor on magnesium chloride generated by reaction of diethoxymagnesium and titanium chloride.

Using 0.02 g the catalyst component A containing 18.16% of magnesium, 3.14% of titanium, 5.32% of di-isobutyl phthalate, and 11.89% of 9,9-bis(methoxymethyl) fluorene, 1.5 ml the cocatalyst triethyl aluminum, and the external electron donor C comprising the structure control agent alkylalkoxysilicon and the activity regulator fatty acid ester, the propylene polymerization results are shown in Table 4.

Examples 21-22

The catalyst component A was prepared by supporting an internal electron donor on magnesium chloride generated by reaction of diethoxymagnesium and titanium chloride.

Using 0.02 g the catalyst component A containing 18.16% of magnesium, 3.14% of titanium, 5.32% of di-isobutyl phthalate, and 11.89% of 9,9-bis(methoxymethyl) fluorene, 1.5 ml the cocatalyst triethyl aluminum, and the external electron donor C which is the activity regulator fatty acid ester, the propylene polymerization results are shown in Table 5.

TABLE 4

| Experiment | Structure control agent | Activity regulator | External electron donor/titanium/ (molar ratio) | Temperature/°C. | Standard catalyst activity At°C./ kgpp/gcat | Tacticity/% | Melt index/ g/10 min | $A_{t°C}/A_{70°C}/\%$ |
|---|---|---|---|---|---|---|---|---|
| $A_0$ | Diisopropyl-dimethoxysilicon | None | | 70 | 18.0 | 96.5 | | |
| $A_1$ | Diisopropyl-dimethoxysilicon | Isopropyl myristate | 20 | 70 | 32.0 | 96.9 | 15.95 | 100 |
| $A_2$ | Diisopropyl-dimethoxysilicon | Isopropyl myristate | 20 | 100 | 15.0 | 97.1 | 49.32 | 46.9 |
| $A_3$ | Diisopropyl-dimethoxysilicon | Isopropyl myristate | 20 | 110 | 13.0 | | | 40.6 |
| $B_0$ | Phenyltrimethoxy-silicon | None | 20 | 70 | 18.0 | 98.3 | 15.44 | |
| $B_1$ | Phenyltrimethoxy-silicon | Isopropyl myristate | 20 | 70 | 34.1 | 97.2 | 50 | 100 |
| $B_2$ | Phenyltrimethoxy-silicon | Isopropyl myristate | 20 | 100 | 20.0 | 96.1 | | 56.7 |
| $B_3$ | Phenyltrimethoxy-silicon | Isopropyl myristate | 20 | 110 | 12.5 | 95.7 | | 36.7 |
| $D_0$ | Propyltrimethoxy-silicon | None | 20 | 70 | 30.0 | 97.5 | 12.89 | |
| $D_1$ | Propyltrimethoxy-silicon | Isopropyl myristate | 20 | 70 | 32.0. | 96.1 | 31.1 | 100 |
| $D_2$ | Propyltrimethoxy-silicon | Isopropyl myristate | 20 | 100 | 19.0 | 96.9 | | 59.4 |
| $D_3$ | Propyltrimethoxy-silicon | Isopropyl myristate | 20 | 110 | 8.2. | 97.3 | | 25.9 |
| $G_0$ | Dicyclopentyl-dimethoxysilicon | None | 30 | 70 | 30.0 | 96.6 | 17.14 | |
| $E_1$ | Dicyclopentyl-dimethoxysilicon | Dibutyl sebacate | 30 | 70 | 32.0. | 98.3 | 27.62 | 100 |
| $E_2$ | Dicyclopentyl-dimethoxysilicon | Dibutyl sebacate | 30 | 100 | 16.0 | 98.2 | 30.42 | 50.0 |
| $F_1$ | Dicyclopentyl-dimethoxysilicon | Isopropyl myristate | 20 | 70 | 31.6. | 96.7 | 10.61 | 100 |
| $F_2$ | Dicyclopentyl-dimethoxysilicon | Isopropyl myristate | 20 | 100 | 17.0 | 98.2 | 17.60 | 53.8 |
| $A_0$ | Diisobutyl-dimethoxysilicon | None | 20 | 70 | 36.0 | 97.2 | 9.75 | |
| $G_1$ | Diisobutyl-dimethoxysilicon | Isopropyl palmitate | 20 | 70 | 38.0. | 96.4 | | 100 |
| $G_2$ | Diisobutyl-dimethoxysilicon | Isopropyl palmitate | 20 | 100 | 18.0 | 96.5 | | 47.4 |
| $H_0$ | Methylcyclohexyl-dimethoxysilicon | None | 20 | 70 | 15.0 | 98.2 | 19.60 | |
| $H_1$ | Methylcyclohexyl-dimethoxysilicon | Isopropyl stearate | 20 | 70 | 43.0. | 96.4 | 24.12 | 100 |
| $H_2$ | Methylcyclohexyl-dimethoxysilicon | Isopropyl stearate | 20 | 100 | 16.0 | 96.4 | 36.42 | 37.2 |
| $H_3$ | Methylcyclohexyl-dimethoxysilicon | Isopropyl stearate | 20 | 110 | 11.8. | 95.8 | 48.54 | 27.4 |

TABLE 5

| Experiment | Structure control agent | Activity regulator | External electron donor/titanium/ (molar ratio) | Temperature/° C. | Standard catalyst activity At° C./ kgpp/gcat | Tacticity/% | Melt index/ g/10 min | $A_{t°C}/A_{70°C}/\%$ |
|---|---|---|---|---|---|---|---|---|
| C$_1$ | None | Isopropyl myristate | 20 | 70 | 39.3 | 95.3 |  | 100 |
| C$_2$ | None | Isopropyl myristate | 20 | 100 | 30.0 | 95.5 |  | 76.3 |
| I$_1$ | None | Isopropyl laurate | 20 | 70 | 34 | 95.9 | 28.4 | 100 |
| I$_2$ | None | Isopropyl laurate | 20 | 100 | 12.0 | 96.4. |  | 35.3 |

We claim:

1. A Z-N catalyst for preparing poly-α-olefins, comprising a catalyst component A formed by supporting an internal electron donor on magnesium chloride, a cocatalyst alkyl aluminum B, and an external electron donor C capable of automatically adjusting the catalyst activity, wherein:
   (1) the catalyst component A is composed of at least titanium ions and a composite internal electron donor aromatic diaciddialkyl ester and 1,3-diether supported on magnesium chloride; and the preparation method of the catalyst component A comprises: a) co-precipitation of a magnesium chloride alcoholate, a composite internal electron donor and titanium tetrachloride; b) supporting titanium tetrachloride and a composite internal electron donor on a spherical magnesium chloride alcoholate support; and c) supporting a composite internal electron donor on magnesium chloride generated by reaction of diethoxymagnesium and titanium tetrachloride;
   (2) the cocatalyst alkyl aluminum B is triethyl aluminum, triisobutyl aluminum or a mixture thereof; and
   (3) the external electron donor C capable of automatically adjusting the catalyst activity comprises an activity regulator, used alone or in combination with a structure control agent; the structure control agent is one or more hydrocarbylalkoxysilicons; and the activity regulator comprises a fatty acid ester and a fatty diaciddiester;
   wherein a molar ratio of total moles of the external electron donor C capable of automatically adjusting the catalyst activity and metal titanium ions in the catalyst component A is 1-500:1,
   wherein the mass fraction of titanium is 2-2.24%,
   wherein the mass fraction of magnesium is 15.0-20.0%, and
   wherein the catalyst has an α-olefin polymerization activity at a temperature from 85° C. to 110° C. that is lower than α-olefin polymerization activity at 70° C.

2. The Z-N catalyst according to claim 1, wherein the structure control agent is hydrocarbylalkoxysilicon R$_n$Si(OCH$_3$)$_{(4-n)}$ where n=1 or 2; wherein when n=1, R is a C$_{1-10}$ linear or branched alkyl, C$_{5-10}$ cycloalkyl, alkylcycloalkyl or cycloalkylalkyl, C$_{6-10}$ phenyl, phenylalkyl or alkylphenyl; and when n=2, R is two hydrocarbyl groups R$^1$ and R$^2$, which may be the same or different and are C$_{1-6}$ linear or branched alkyl, C$_{5-6}$cycloalkyl, C$_{1-6}$ alkyl and cycloalkyl, or phenyl.

3. The Z-N catalyst according to claim 2, wherein the hydrocarbylmethoxysilicon is selected from: propyltrimethoxysilicon, phenyltrimethoxysilicon, diisopropyldimethoxysilicon, diisobutyldimethoxysilicon, methylcyclohexyldimethoxysilicon, dicyclopentyldimethoxysilicon, and diphenyldimethoxysilicon.

4. The Z-N catalyst according to claim 1, wherein one or more of the fatty acid ester and fatty diaciddiester comprises C$_{10-20}$ linear fatty acid C$_{3-6}$ branched alkyl ester or C$_{4-16}$ linear fatty diacid C$_{2-6}$ linear or branched dialkyl ester.

5. The Z-N catalyst according to claim 4, wherein the fatty acid ester is selected from the group consisting of isopropyl laurate, isoamyllaurate, isopropyl myristate, isoamylmyristate, isopropyl palmitate, isopropyl stearate; and the fatty diaciddiester is selected from diethyl adipate, di-n-butyl adipate, di-isobutyl adipate, diethyl suberate, di-n-butyl suberate, diisobutylsuberate, diethyl sebacate, di-n-butyl sebacate, and diisobutylsebacate.

6. The Z-N catalyst according to claim 1, wherein in the catalyst component A, the mass fraction of 1,3-diether is 1-13%, and the mass fraction of the aromatic diaciddialkyl ester is 1-8%.

7. The Z-N catalyst according to claim 1, wherein in the catalyst component A, the aromatic diaciddialkyl ester is di-n-butyl phthalate; the 1,3-diether is 9,9-bis(methoxymethyl) fluorene; and the composite internal electron donor is di-n-butyl phthalate and 9,9-bis(methoxymethyl) fluorene.

8. The Z-N catalyst according to claim 7, wherein a molar ratio of di-n-butyl phthalate and 9,9-bis(methoxymethyl) fluorene is 1-9.9:10.

9. The Z-N catalyst according to claim 1, wherein a molar ratio of the structure control agent and the activity regulator is 0-10:10.

10. The Z-N catalyst for preparing poly-α-olefins according to claim 1, wherein the preparing poly-α-olefins comprises: propylene polymerization, 1-butene polymerization, ethylene and propylene copolymerization, ethylene and 1-butene copolymerization, or propylene and 1-butene copolymerization.

11. A method of using the Z-N catalyst according to claim 1 in preparing poly-α-olefins, comprising causing an α-olefin or α-olefins to undergo polymerization or copolymerization in the presence of the Z-N catalyst,
   wherein the polymerization and the copolymerization of the α-olefin or α-olefins are continuous polymerization, and
   wherein a reactor for continuous polymerization is more than one reactor in series, or a reactor for continuous polymerization is a fluidized bed reactor.

12. The method of the Z-N catalyst in preparing poly-α-olefins according to claim 11, wherein the polymerization and the copolymerization of α-olefins are continuous gas-phase polymerization, and a reactor for continuous gas-phase polymerization is more than one reactor in series, or a reactor for continuous gas-phase polymerization is a fluidized bed reactor.

13. The method according to claim 12, wherein in the polymerization and the copolymerization of α-olefins, the structure control agent and the activity regulator are added into a reactor in a variety of ways: the structure control agent and the activity regulator are together or separately added into a reactor simultaneously with the catalyst component A or the cocatalyst component B; in the process with more than one reactor in series, the structure control agent and the activity regulator are together or separately added into a first reactor simultaneously with the catalyst component A or the cocatalyst component B, or the structure control agent is added into the first reactor and then the activity regulator is added into a different reactor.

14. The method of claim 11, wherein the Z-N catalyst is according to claim 9.

15. The method of claim 11, wherein the Z-N catalyst is according to claim 10.

16. The Z-N catalyst according to claim 1, wherein in the catalyst component A, the aromatic diaciddialkyl ester is di-isobutyl phthalate; the 1,3-diether is 9,9-bis(methoxymethyl) fluorene; and the composite internal electron donor is di-isobutyl phthalate and 9,9-bis(methoxymethyl) fluorene.

17. The Z-N catalyst according to claim 16, wherein a molar ratio of di-isobutyl phthalate and 9,9-bis(methoxymethyl) fluorene is 1-9.9:10.

18. The method according to claim 11, wherein the α-olefin is propylene, the method forming a polypropylene having a tacticity of 95-99%.

19. The Z-N catalyst according to claim 1, wherein the activity regulator increases the activity of the Z-N catalyst by 5.6% to 186.7% under a normal polymerization of 70° C., as compared with the activity of a Z-N catalyst without the activity regulator, and decreases the activity of the Z-N catalyst to 37.2% to 88.2% of the activity of a catalyst without the activity regulator under an abnormal polymerization of 100° C.

20. A Z-N catalyst for preparing poly-α-olefins, comprising a catalyst component A formed by supporting an internal electron donor on magnesium chloride, a cocatalyst alkyl aluminum B, and an external electron donor C capable of automatically adjusting the catalyst activity, wherein:

(1) the catalyst component A is composed of at least titanium ions and a composite internal electron donor aromatic diaciddialkyl ester and 1,3-diether supported on magnesium chloride; and the preparation method of the catalyst component A comprises: a) co-precipitation of a magnesium chloride alcoholate, a composite internal electron donor and titanium tetrachloride; b) supporting titanium tetrachloride and a composite internal electron donor on a spherical magnesium chloride alcoholate support; and c) supporting a composite internal electron donor on magnesium chloride generated by reaction of diethoxymagnesium and titanium tetrachloride;

(2) the cocatalyst alkyl aluminum B is triethyl aluminum, triisobutyl aluminum or a mixture thereof; and (3) the external electron donor C capable of automatically adjusting the catalyst activity comprises a structure control agent and an activity regulator, used in combination or alone; the structure control agent is one or more hydrocarbylalkoxysilicons and the activity regulator is one or more fatty acid esters, wherein a molar ratio of total moles of the external electron donor C capable of automatically adjusting the catalyst activity and metal titanium ions in the catalyst component A is 1-500:1, wherein the mass fraction of titanium is 2-2.24%, wherein the mass fraction of magnesium is 15.0-20.0%, and wherein the catalyst has an α-olefin polymerization activity at a temperature from 85° C. to 110° C. that is lower than α-olefin polymerization activity at 70° C.

* * * * *